US011768613B2

(12) United States Patent
Kale et al.

(10) Patent No.: US 11,768,613 B2
(45) Date of Patent: Sep. 26, 2023

(54) AGGREGATION AND VIRTUALIZATION OF SOLID STATE DRIVES

(71) Applicant: Micron Technology, Inc., Boise, ID (US)

(72) Inventors: Poorna Kale, Folsom, CA (US); Christopher Joseph Bueb, Folsom, CA (US); Taufique Murad Ahmed, Folsom, CA (US); Sven Lehsten, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/452,333

(22) Filed: Jun. 25, 2019

(65) Prior Publication Data

US 2020/0409574 A1   Dec. 31, 2020

(51) Int. Cl.
*G06F 3/06* (2006.01)
*G06F 12/02* (2006.01)

(52) U.S. Cl.
CPC .......... *G06F 3/0626* (2013.01); *G06F 3/0646* (2013.01); *G06F 3/0679* (2013.01); *G06F 12/0246* (2013.01); *G06F 12/0284* (2013.01)

(58) Field of Classification Search
CPC .... G06F 3/0626; G06F 3/0638; G06F 3/0646; G06F 3/0655; G06F 3/0658; G06F 3/0659; G06F 3/0661; G06F 3/0662; G06F 3/0679; G06F 3/0683; G06F 12/0238; G06F 12/0246; G06F 12/0284; G06F 12/0292
USPC ....... 710/74, 5, 105, 305; 711/115, 103, 104
See application file for complete search history.

(56) References Cited

U.S. PATENT DOCUMENTS

| | | | |
|---|---|---|---|
| 6,654,941 B1 | 11/2003 | Baumbach | |
| 7,813,271 B2 | 10/2010 | Fourcand | |
| 8,127,059 B1 * | 2/2012 | Carr | G06F 13/387 |
| | | | 711/100 |
| RE43,346 E | 5/2012 | Miloushev et al. | |
| 8,397,013 B1 | 3/2013 | Rosenband et al. | |
| 8,694,724 B1 | 4/2014 | Linnell et al. | |
| 8,700,817 B2 | 4/2014 | Chen et al. | |
| 8,706,701 B1 | 4/2014 | Stefanov et al. | |
| 8,719,417 B1 | 5/2014 | Liu | |
| 8,880,801 B1 | 11/2014 | Robins et al. | |

(Continued)

FOREIGN PATENT DOCUMENTS

KR   100964152   6/2010

OTHER PUBLICATIONS

Aggregated and Virtualized Solid State Drives with Multiple Host Interfaces, U.S. Appl. No. 16/452,340, filed Jun. 25, 2019, Poorna Kale, et al, Sent to Classification contractor, Jul. 3, 2019.

(Continued)

*Primary Examiner* — Ilwoo Park
(74) *Attorney, Agent, or Firm* — Greenberg Traurig (57) ABSTRACT

A solid state drive having a drive aggregator configured to interface with a host system, and a plurality of component solid state drives connected to the drive aggregator. Each of the component solid state drives has a controller capable of processing commands from host systems. The drive aggregator is configured to receive commands from the host system and transmit commands to the component solid state drives to implement the commands received from the host system.

19 Claims, 5 Drawing Sheets

(56) References Cited

U.S. PATENT DOCUMENTS

| | | |
|---|---|---|
| 8,935,493 B1 | 1/2015 | Dolan et al. |
| 9,031,910 B2 | 5/2015 | Driesen |
| 9,262,490 B2 | 2/2016 | Colrain et al. |
| 10,437,476 B2 | 10/2019 | Frolikov |
| 10,628,326 B2 | 4/2020 | Haswell |
| 10,764,180 B1 | 9/2020 | Klein |
| 10,942,846 B2 | 3/2021 | Bueb et al. |
| 10,942,881 B2 | 3/2021 | Kale et al. |
| 11,055,249 B2 | 7/2021 | Bueb et al. |
| 11,216,365 B1 | 1/2022 | Kuzmin et al. |
| 11,354,262 B2 | 6/2022 | Kale et al. |
| 11,500,766 B2 | 11/2022 | Bueb et al. |
| 2004/0260861 A1 | 12/2004 | Serizawa et al. |
| 2005/0144401 A1 | 6/2005 | Pantalone et al. |
| 2005/0280140 A1 | 12/2005 | Corbin, Jr. et al. |
| 2006/0005063 A1 | 1/2006 | Patrick et al. |
| 2006/0059308 A1 | 3/2006 | Uratani et al. |
| 2009/0188704 A1 | 7/2009 | Lee et al. |
| 2009/0276567 A1 | 11/2009 | Burkey |
| 2010/0082890 A1 | 4/2010 | Heo et al. |
| 2010/0259882 A1* | 10/2010 | Song .............. H05K 1/185 361/679.32 |
| 2010/0259885 A1 | 10/2010 | Zheng et al. |
| 2011/0191649 A1 | 8/2011 | Lim et al. |
| 2011/0276579 A1 | 11/2011 | Colrain et al. |
| 2012/0079180 A1* | 3/2012 | Ren .............. G06F 13/1689 711/105 |
| 2012/0159052 A1 | 6/2012 | Lee et al. |
| 2012/0233386 A1* | 9/2012 | Tong .............. G06F 3/0659 711/103 |
| 2012/0266011 A1 | 10/2012 | Storer et al. |
| 2013/0036128 A1 | 2/2013 | Ben-tsion et al. |
| 2013/0332694 A1 | 12/2013 | Reissner |
| 2014/0075143 A1 | 3/2014 | Matsuya et al. |
| 2015/0130059 A1 | 5/2015 | Ozawa et al. |
| 2015/0255130 A1* | 9/2015 | Lee .............. H04L 67/1097 711/103 |
| 2016/0124847 A1* | 5/2016 | Malwankar .............. G06F 9/00 711/103 |
| 2016/0154591 A1 | 6/2016 | Breakstone et al. |
| 2016/0179730 A1 | 6/2016 | Halleck et al. |
| 2017/0010961 A1 | 1/2017 | Tan |
| 2017/0046295 A1* | 2/2017 | Schwemmer ....... G06F 13/4282 |
| 2017/0109184 A1 | 4/2017 | Ramani et al. |
| 2017/0228328 A1* | 8/2017 | Armstrong .......... G06F 13/4022 |
| 2017/0249256 A1* | 8/2017 | Kim .............. G06F 3/061 |
| 2018/0088854 A1 | 3/2018 | Noh et al. |
| 2018/0150401 A1 | 5/2018 | Chang |
| 2018/0165169 A1 | 6/2018 | Camp et al. |
| 2018/0261286 A1 | 9/2018 | Hermesh et al. |
| 2018/0284989 A1 | 10/2018 | Kachare et al. |
| 2019/0057047 A1 | 2/2019 | Hsu et al. |
| 2019/0079895 A1* | 3/2019 | Kim .............. G06F 3/0659 |
| 2019/0278498 A1* | 9/2019 | Dedrick .............. G06F 3/0631 |
| 2019/0294339 A1* | 9/2019 | Bolkhovitin .......... G06F 3/0607 |
| 2020/0045110 A1 | 2/2020 | Varnica et al. |
| 2020/0050470 A1 | 2/2020 | Guo et al. |
| 2020/0151104 A1 | 5/2020 | Yang |
| 2020/0201575 A1 | 6/2020 | Mizrahi |
| 2020/0379933 A1* | 12/2020 | Worley .............. G06F 13/4022 |
| 2020/0401311 A1* | 12/2020 | Kanno .............. G06F 12/0246 |
| 2020/0409567 A1 | 12/2020 | Bueb et al. |
| 2020/0409807 A1 | 12/2020 | Kale et al. |
| 2020/0409832 A1 | 12/2020 | Bueb et al. |
| 2020/0409889 A1 | 12/2020 | Kale et al. |
| 2020/0409890 A1 | 12/2020 | Bueb et al. |
| 2020/0409891 A1 | 12/2020 | Kale et al. |
| 2021/0157719 A1 | 5/2021 | Bueb et al. |
| 2021/0173803 A1 | 6/2021 | Kale et al. |
| 2021/0208821 A1* | 7/2021 | Worley .............. G06F 3/0632 |
| 2021/0271622 A1 | 9/2021 | Bueb et al. |
| 2021/0373997 A1 | 12/2021 | Kirkpatrick et al. |

OTHER PUBLICATIONS

Fail-safe Redundancy in Aggregated and Virtualized Solid State Drives, U.S. Appl. No. 16/452,341, filed Jun. 25, 2019, Christopher Bueb, et al, Sent to Classification contractor, Jul. 3, 2019.

Dynamic Fail-safe Redundancy in Aggregated and Virtualized Solid State Drives, U.S. Appl. No. 16/452,344, filed Jun. 25, 2019, Poorna Kale, et al, Sent to Classification contractor, Jul. 3, 2019.

Access Optimization in Aggregated and Virtualized Solid State Drives, U.S. Appl. No. 16/452,366, filed Jun. 25, 2019, Christopher Bueb, et al, Sent to Classification contractor, Jul. 3, 2019.

Aggregated and Virtualized Solid State Drives Accessed Via Multiple Logical Address Spaces, U.S. Appl. No. 16/452,369, filed Jun. 25, 2019, Christopher Bueb, et al, Sent to Classification contractor, Jul. 3, 2019.

Parallel Operations in Aggregated and Virtualized Solid State Drives, U.S. Appl. No. 16/452,372, filed Jun. 25, 2019, Poorna Kale, et al, Sent to Classification contractor, Jul. 3, 2019.

* cited by examiner

AGGREGATION AND VIRTUALIZATION OF SOLID STATE DRIVES

FIELD OF THE TECHNOLOGY

At least some embodiments disclosed herein relate to memory systems in general, and more particularly, but not limited to aggregation and virtualization of solid state drives.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

For example, a computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a specific type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to techniques to aggregate multiple memory sub-systems as a combined memory sub-system that functions as a single memory sub-system to a host system.

Currently, a solid state drive (SSD) can be provided in a single integrated circuit package. For example, the solid state drive (SSD) can be packaged with a ball grid array (BGA) form factor. The BGA SSD has a controller embedded in the integrated circuit package to process commands from a host system, control operations to access data in media units or memory components embedded in the BGA SSD, and generate responses to the commands from the host system. However, the single integrated circuit package and/or the BGA form factor can limit the storage capacity of the BGA SSD.

At least some aspects of the present disclosure address the above and other deficiencies through a drive aggregator that is configured to aggregate and virtualize multiple SSDs as a single SSD for the host system. Thus, multiple BGA SSDs can be used to construct one high capacity SSD for the host system. The combined SSD can have a storage capacity that is not limited by the single integrated circuit package and/or the BGA form factor.

In general, the drive aggregator can be used to aggregate and virtualize multiple memory sub-systems for a host system. One example of a memory sub-system is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

Figure 1:
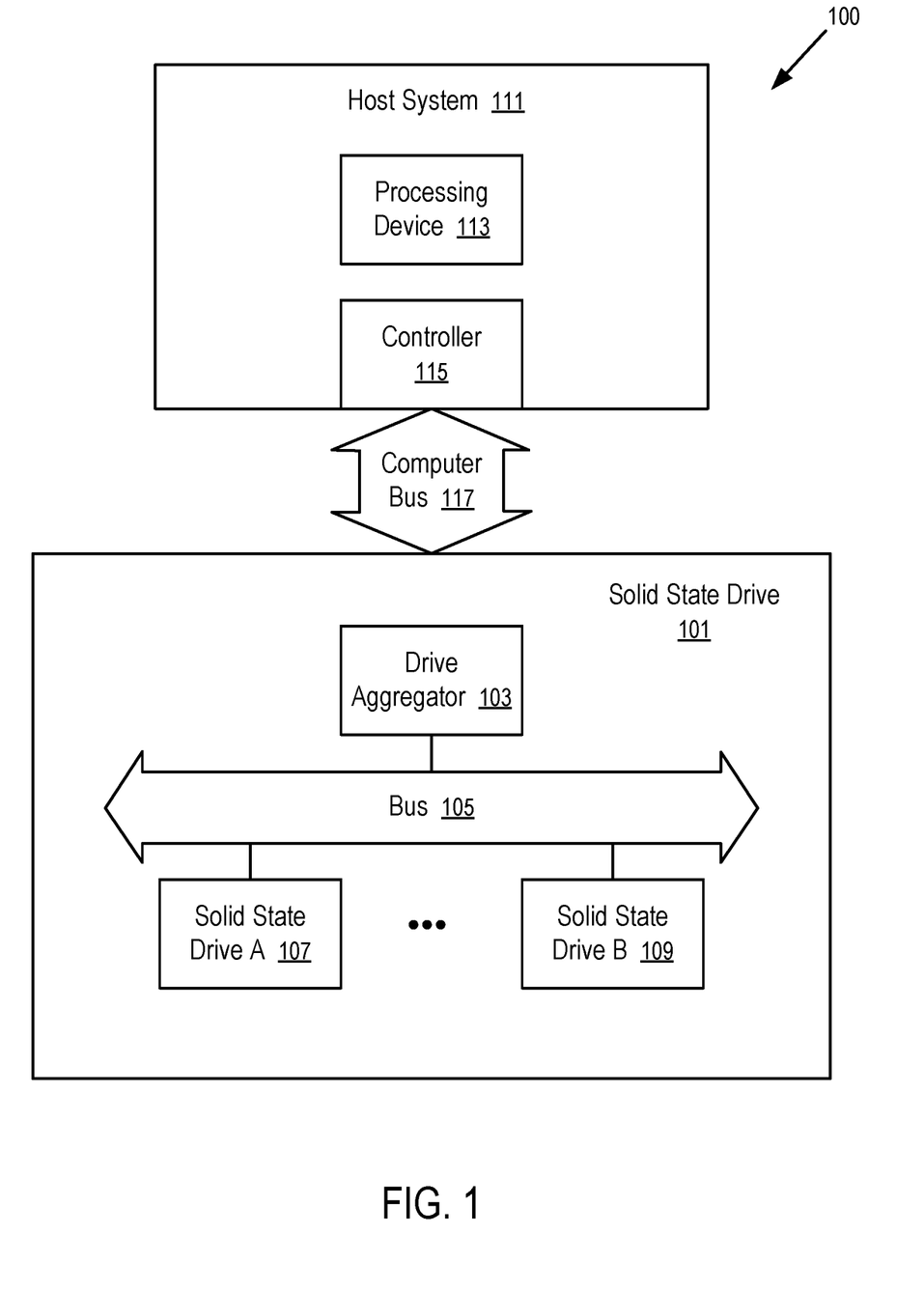
FIG. 1 illustrates an example computing system having a memory sub-system in accordance with some embodiments of the present disclosure.

FIG. 1 illustrates an example computing system 100 having a memory sub-system in accordance with some embodiments of the present disclosure. In FIG. 1, a solid state drive 101 is shown as an example of such a memory sub-system. The aggregated solid state drive 101 is constructed using multiple component solid state drives 107 to 109. A drive aggregator 103 of the solid state drive 101 virtualizes the entire combined capacity of the multiple component solid state drives 107 to 109 as the capacity of the aggregated solid state drive 101. The drive aggregator 103 shields the component solid state drives 107 to 109 from a host system 111 such that the host system 111 can access the memory capacity of the multiple component solid state drives 107 to 109 by addressing the single solid state drive 101. Each of the component solid state drives 107 to 109 in FIG. 1 is another example of a memory sub-system in general.

In general, a memory sub-system can include media, such as media units/memory components. The media units/memory components can be volatile memory components, non-volatile memory components, or a combination of such. Each of the media units/memory components can perform operations to store, record, program, write, or commit new data independent of the operations of other media units/memory components. Thus, the media units/memory components can be used in parallel in executing write commands. In some embodiments, the memory sub-system is a storage system. An example of a storage system is a solid state drive (SSD). In other embodiments, the memory sub-system is a memory module. Examples of a memory module includes a DIMM, NVDIMM, and NVDIMM-P. In further embodiments, the memory sub-system is a hybrid memory/storage sub-system. In general, the computing system 100 can include a host system 111 that uses a memory sub-system (e.g., the solid state drive 101) through a computer bus 117. For example, the host system 111 can write data to the memory sub-system and read data from the memory sub-system.

The host system 111 can be a computing device such as a desktop computer, laptop computer, network server, mobile device, or such computing device that includes a memory and a processing device. The host system 111 can include or be coupled to the memory sub-system, such as the solid state drive 101, via a computer bus 117, so that the host system 111 can read data from or write data to the memory sub-system. The host system 111 can be coupled to the memory sub-system via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 111 and the memory sub-system, such as the solid state drive 101. The host system 111 can further utilize an NVM Express (NVMe) interface to access the storage capacity of the memory sub-system when the memory sub-system is coupled with the host system 111 by the PCIe interface. The physical host interface can provide an interface for passing control, address, data, and other signals between the host system 111 and the memory sub-system, such as the solid state drive 101. FIG. 1 illustrates a solid state drive 101 as an example a memory sub-system. In general, the host system 111 can access multiple memory sub-systems via a same communication connection, multiple separate communication connections, and/or a combination of communication connections.

The host system 111 includes a processing device 113 and a controller 115. The processing device 113 of the host system 111 can be, for example, a microprocessor, a central processing unit (CPU), a processing core of a processor, an execution unit, etc. In some instances, the controller 115 can be referred to as a memory controller, a memory management unit, and/or an initiator. In one example, the controller 115 controls the communications over the computer bus 117 coupled between the host system 111 and the memory sub-system, such as the solid state drive 101.

In general, the controller 115 can send commands or requests to a memory sub-system for desired access to memory storage capacity. The controller 115 can further include interface circuitry to communicate with the memory sub-system via the computer bus 117. The interface circuitry can convert responses received from memory sub-system into information for the host system 111.

The controller 115 of the host system 111 can communicate with controller 115 of the memory sub-system to perform operations such as reading data, writing data, or erasing data at the memory components of the memory sub-system and other such operations. In some instances, the controller 115 is integrated within the same integrated circuit package of the processing device 113. In other instances, the controller 115 is separate from the integrated circuit package of the processing device 113. The controller 115 and/or the processing device 113 can include hardware such as one or more integrated circuits and/or discrete components, a buffer memory, a cache memory, or a combination thereof. The controller 115 and/or the processing device 113 can be a microcontroller, special purpose logic circuitry (e.g., a field programmable gate array (FPGA), an application specific integrated circuit (ASIC), etc.), or another suitable processor.

In general, media units/memory components of a memory sub-system (e.g., the solid state drive 107 or 109) can include any combination of the different types of non-volatile memory components and/or volatile memory components. An example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 111. Although non-volatile memory components such as NAND type flash memory are described, the memory components can be based on any other type of memory such as a volatile memory. In some embodiments, the memory components can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components can be grouped as memory pages or data blocks that can refer to a unit of the memory component used to store data.

In general, a memory sub-system (e.g., the solid state drive 107 or 109) can have a controller that communicates with the memory components of the memory sub-system to perform operations such as reading data, writing data, or erasing data and other such operations (e.g., in response to commands scheduled on a command bus). The controller of the memory sub-system can include hardware such as one or more integrated circuits and/or discrete components, a buffer memory, or a combination thereof. The controller of the memory sub-system can be a microcontroller, special purpose logic circuitry (e.g., a field programmable gate array (FPGA), an application specific integrated circuit (ASIC), etc.), or another suitable processor. The controller of the memory sub-system can include a processing device (e.g., processor) configured to execute instructions stored in local memory of the controller. For example, the local memory of the controller of the memory sub-system can include an embedded memory configured to store instructions for performing various processes, operations, logic flows, and routines that control operation of the memory sub-system, including handling communications between the memory sub-system and a host system (e.g., 111). In some embodiments, the local memory can include memory registers storing memory pointers, fetched data, etc. The local memory can also include read-only memory (ROM) for storing micro-code. While a typical memory sub-system has a controller, in another embodiment of the present disclosure, a memory sub-system may not include a controller, and can instead rely upon external control (e.g., provided by an external host, or by a processor or controller separate from the memory sub-system).

In general, the controller of a memory sub-system (e.g., the solid state drive 107 or 109) can receive commands or operations from the host system 111 and can convert the commands or operations into instructions or appropriate commands to achieve the desired access to the memory components of the memory sub-system. The controller of the memory sub-system (e.g., the solid state drive 107 or 109) can be responsible for other operations such as wear leveling operations, garbage collection operations, error detection and error-correcting code (ECC) operations, encryption operations, caching operations, and address translations between a logical block address and a physical block address. The controller of the memory sub-system (e.g., the solid state drive 107 or 109) can further include host interface circuitry to communicate with a host system (e.g., 111) via the physical host interface. The host interface circuitry can convert the commands received from the host system into command instructions to access the memory components as well as convert responses associated with the memory components into information for the host system (e.g., 111).

A memory sub-system (e.g., the solid state drive 107 or 109) can also include additional circuitry or components. In some embodiments, the memory sub-system (e.g., the solid state drive 107 or 109) can include a cache or buffer (e.g., DRAM) and address circuitry (e.g., a row decoder and a column decoder) that can receive an address from the controller of the memory sub-system and decode the address to access the memory components in the memory sub-system.

The computing system 100 includes a drive aggregator 103 that aggregates the capacities of the component solid state drives 107 to 109 and virtualize the entire combined capacity as the capacity of the single solid state drive 101. In some embodiments, the drive aggregator 103 includes logic circuitry to translate the commands/requests from the host system 111 into commands/requests to the solid state drives 107 to 109 and/or translate the responses from the solid state drives 107 to 109 into responses to the host system 111. The drive aggregator 103 accesses commands from the host system 111 according to a communication protocol for a solid state drive to accept commands from host systems. The drive aggregator 103 constructs and transmits commands to each of the component solid state drives (e.g., 107 or 109) according to a communication protocol for host systems to issue commands to solid state drives. The drive aggregator 103 accepts responses from each of the component solid state drives (e.g., 107 or 109) according to a communication protocol between host systems and solid state drives. The drive aggregator 103 constructs and transmits responses to the host system 111 according to communication protocol between host systems and solid state drives. The communication protocol used between the host system 111 and the drive aggregator 103 can be the same as the communication protocol used between the drive aggregator 103 and the component solid state drives 107 to 109 in one embodiment. The communication protocol used between the host system 111 and the drive aggregator 103 can be different from the communication protocol used between the drive aggregator 103 and the component solid state drives 107 to 109 in one embodiment. The drive aggregator 103 behaves like a controller of a standard solid state drive to the host system 111 according to one communication protocol and behaves like a standard host system to the component solid state drives 107 to 109 according to the same, or a different, communication protocol.

In the solid state drive 101, the drive aggregator 103 is connected to the component solid state drives 107 to 109 via a bus 105. For example, the bus 105 can include point to point serial connections from the drive aggregator 103 to the component solid state drives 107 to 109. The point to point serial connections between the drive aggregator 103 and the component solid state drives 107 to 109 can be in accordance with a serial advanced technology attachment (SATA) communication protocol, a peripheral component interconnect express (PCIe) communication protocol, or another protocol. The computer bus 117 between the host system 111 and the drive aggregator 103 can be in accordance with a serial advanced technology attachment (SATA) communication protocol, a peripheral component interconnect express (PCIe) communication protocol, a universal serial bus (USB) communication protocol, a Fibre Channel communication protocol, a Serial Attached SCSI (SAS) communication protocol, a double data rate (DDR) memory bus communication protocol, etc.

The drive aggregator 103 can be implemented using an integrated circuit chip having a field programmable gate array (FPGA) or an application specific integrated circuit (ASIC). Alternatively, the drive aggregator 103 can be implemented at least in part via software or firmware. For example, the drive aggregator 103, or the processing device embedded within the drive aggregator 103, can be configured to execute instructions stored in memory for performing the operations of the drive aggregator 103 described herein. In some embodiments, the drive aggregator 103 is implemented in a single integrated circuit chip configured on the overall solid state drive 101 that has multiple component solid state drives 107.

Figure 2:
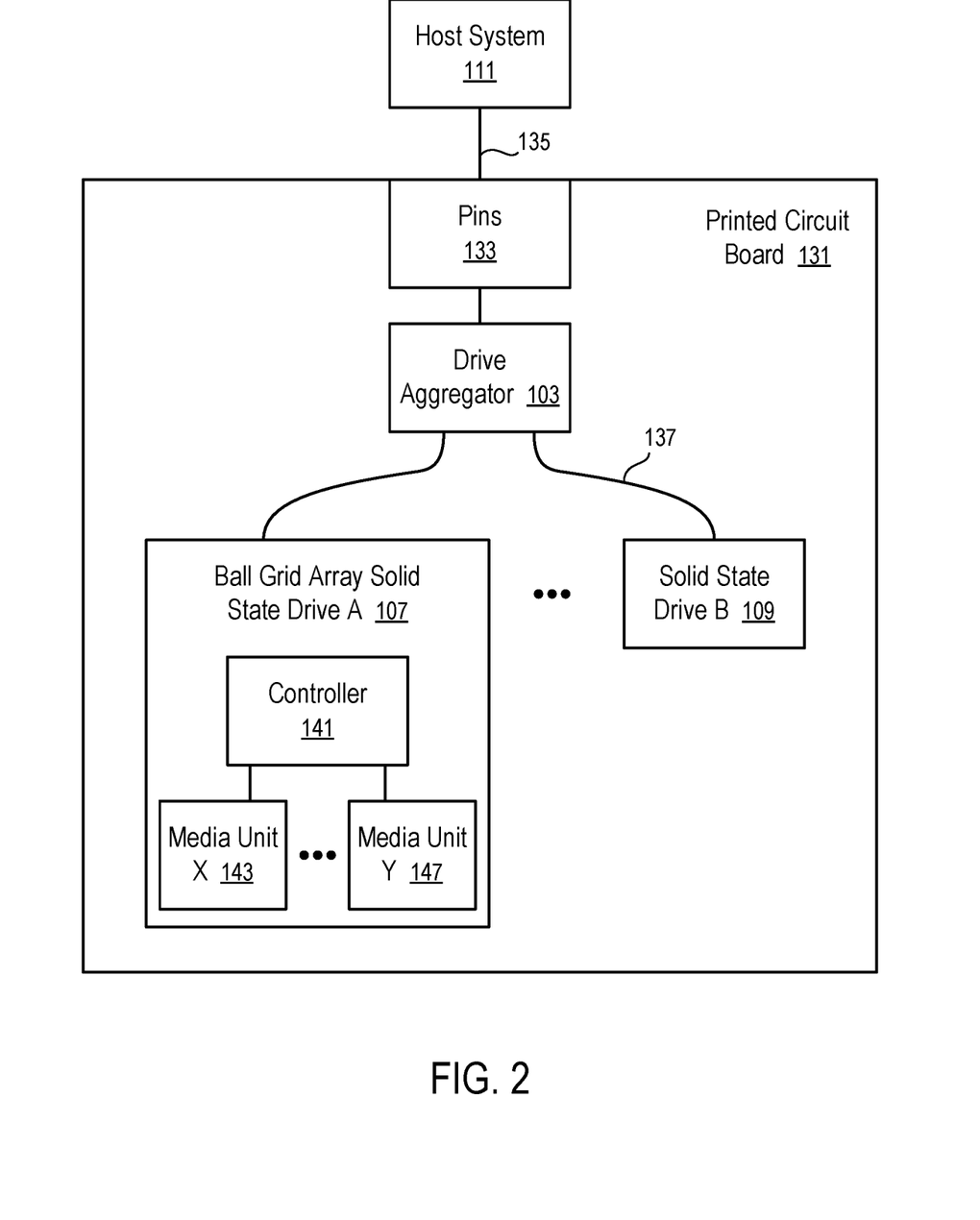
FIG. 2 shows a host system connected to a virtualized single solid state drive having multiple component solid state drives.

FIG. 2 shows a host system 111 connected to a virtualized single solid state drive having multiple component solid state drives 107 to 109. For example, the virtualized single solid state drive can be used to implement the solid state drive 101 illustrated in FIG. 1

In FIG. 2, a printed circuit board 131 is configured to have pins 133 for a connection 135 to the host system 111 as a single solid state drive 101. For example, the connection 135 can be a point to point serial connection in accordance with SATA, PCIe, USB, or another standard. Based on the communication standard, the host system 111 is configured to recognize the device configured on the printed circuit board 131 as a single solid state drive 101. The host system 111 addresses memory in the device based on the recognition of the device as a single solid state drive 101.

Commands from the host system 111 are received in the drive aggregator 103 via the connection 135 and the pins 133. The received commands are processed in the drive aggregator 103 for adjustment, mapping, and/or distribution to the component solid state drives 107 to 109. For example, each of the component solid state drives 107 to 109 can be implemented as a ball grid array (BGA) solid state drive (SSD) that is capable of processing the commands from the host system 111 directly. For example, when the connection 137 from the component solid state drive 109 to the drive aggregator 103 is reconnected directly to the host system 111, the host system 111 can recognize the solid state drive 109 and communicate directly the solid state drive 109 to store data in the solid state drive 109 and/or retrieve data from the solid state drive 109.

For example, a BGA SSD 107 can have a controller 141 that is capable of communicating with a host system (e.g., 111) directly to receive commands and provide responses; and the BGA SSD 107 can have multiple media units (memory components) 143 to 147 that have memory cells to store data.

The drive aggregator 103 is configured to shield the details of the component solid state drives 107 to 109 from the host system 111. Thus, the host system 111 does not have to address the component solid state drives 107 to 109 separately. For examples, according to a set of predetermined rules, the drive aggregator 103 can forward some commands from host system 111 to one component solid state drive (e.g., 107) and forward other commands from the host system 111 to another component solid state drive (e.g., 109).

For example, the drive aggregator 103 can divide the logical address space of the entire capacity of the device configured on the printed circuit board 131 into multiple regions. Each of the regions is associated with a corresponding one of the component solid state drives 107 to 109. When the drive aggregator 103 receives a command is received from the host system 111, the drive aggregator 103 determines the region in which the logical address of the command is located, identifies the target solid state drive (e.g., 107) that is associated with the determined region, adjusts the command to at least map the logical address in the command received in the host to the logical address in the target solid state drive (e.g., 107), and transmits the adjusted command to the target solid state drive (e.g., 107).

In some embodiments, the host system 111 is configured to organize the memory capacity of the virtualized single solid state drive 101 on the printed circuit board into named portions. A name portion of the memory capacity is a namespace. Logical addresses can be defined within different namespaces separate for the memory capacity of the virtualized single solid state drive 101. For example, a first namespace allocated on a first portion of the memory capacity of n blocks can have logical block addressing (LBA) addresses ranging from 0 to n−1; and a second namespace allocated on a second portion of the memory capacity of m block can have LBA addresses ranging from 0 to m−1. To access a memory block, the host system 111 identifies the namespace and the LBA address defined within the namespace.

The drive aggregator 103 can be configured to distribute operations requested by the host system 111 to the component solid state drives 107 to 109 based on namespaces. For example, the drive aggregator 103 can assign different namespaces created on the memory capacity of the virtualized single solid state drive 101 to different component solid state drives 107 to 109. Subsequently, the drive aggregator 103 can simply forward the commands from the host system 111 to the component solid state drives based on the namespaces specified in the commands.

Figure 3:
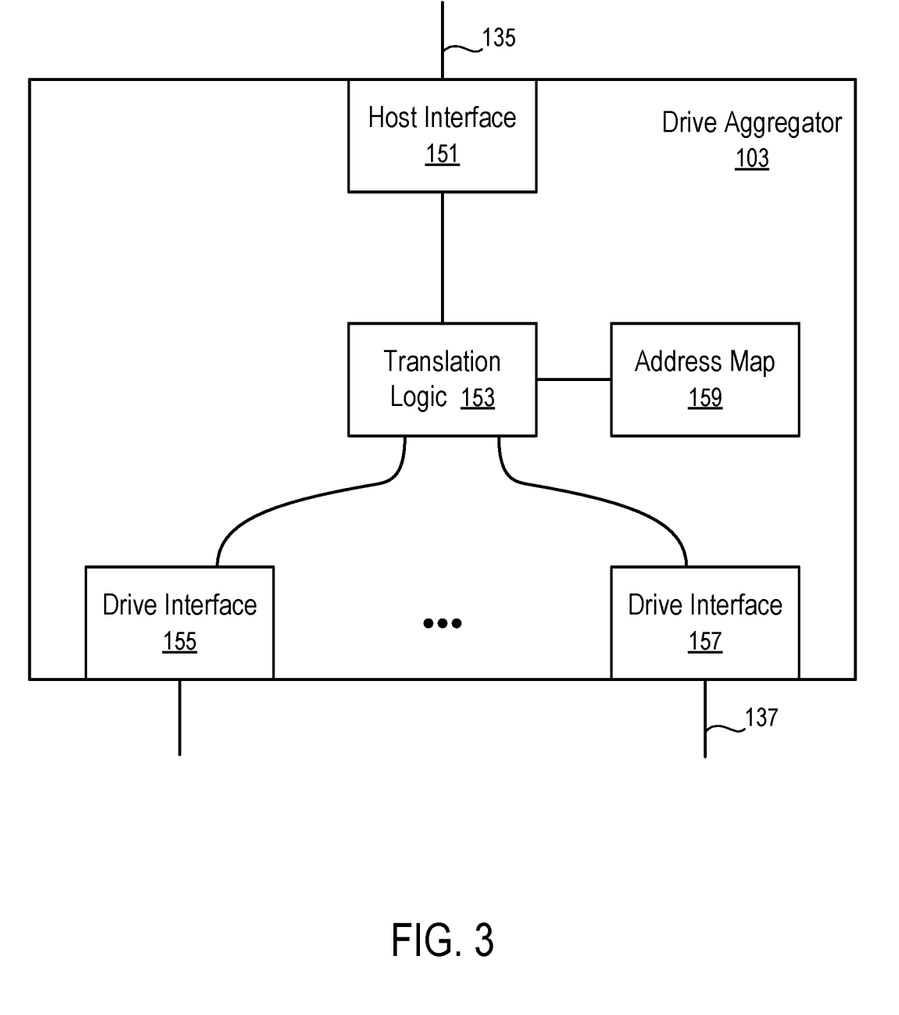
FIG. 3 shows a drive aggregator according to one embodiment.

FIG. 3 shows a drive aggregator 103 according to one embodiment. For example, the drive aggregator 103 of FIG. 3 can be used on the printed circuit board 131 of FIG. 2 and/or in the virtualized single solid state drive 101 of FIG. 1.

The drive aggregator 103 of FIG. 3 can be integrated within a single integrated circuit chip. The drive aggregator 103 of FIG. 3 includes a host interface 151 for a connection 135 to a host system (e.g., 111), a translation logic 153, and multiple drive interfaces 155 to 157. Each of the drive interfaces 155 to 157 can be used for a connection (e.g., 137) to a component solid state drive (e.g., 109).

The host interface 151 is configured to implement a solid state drive side of a communication protocol between host systems and solid state drives. Each of the drive interfaces 155 and 157 is configured to implement a host system side of a communication protocol between host systems and solid state drives. In some instances, the drive interfaces 155 to 157 can support different communication protocols (e.g., SATA and PCIe) such that the different types of component solid state drives 107 to 109 can be used.

The translation logic 153 is configured to receive a command from the host interface 151 and generate one or more commands for the drive interfaces 155 to 157. When one or more corresponding responses are received from the drive interfaces 155 to 157, the translation logic 153 generates a response to the command from the host interface 151.

The drive aggregator 103 has an address map 159 that controls the operation of the translation logic 153. For example, the address map 159 can be used to translate a logical address in the capacity of the virtualized single solid state drive 101 to the corresponding logical address in the capacity of a corresponding component solid state drive (e.g., 107 or 109) connected to one of the drive interfaces 155 to 157. Based on the address translation, the translation logic 153 can generate corresponding commands for the respective drive interfaces (e.g., 155 or 157).

In some implementations, the communication protocols used in the connection 135 and in the connection 137 are different. Thus, the translation logic 153 performs the command translations according to the differences in the communication protocols.

In some implementations, the communication protocols used in the connection 135 and in the connection 137 are different; and the translation logic 153 can simply forward a command received in the connection 135 to the drive interface 157. For example, when a namespace is created on the component solid state drive (e.g., 109) connected to drive interface 157, a command from the host interface 151 for read or write operations in the namespace can be forward to the drive interface 157.

The translation logic 153 can be implemented as a field programmable gate array (FPGA), an application specific integrated circuit (ASIC), or one or more microprocessors executing a set of instructions. The instructions and/or the address map 159 can be stored in a local memory unit of the drive aggregator 103. Alternatively, or in combination, the instructions and/or the address map 159 can be stored in one or more of the component solid state drives (e.g., 107 to 109) connected to the drive interfaces 155 to 157.

Figure 4:
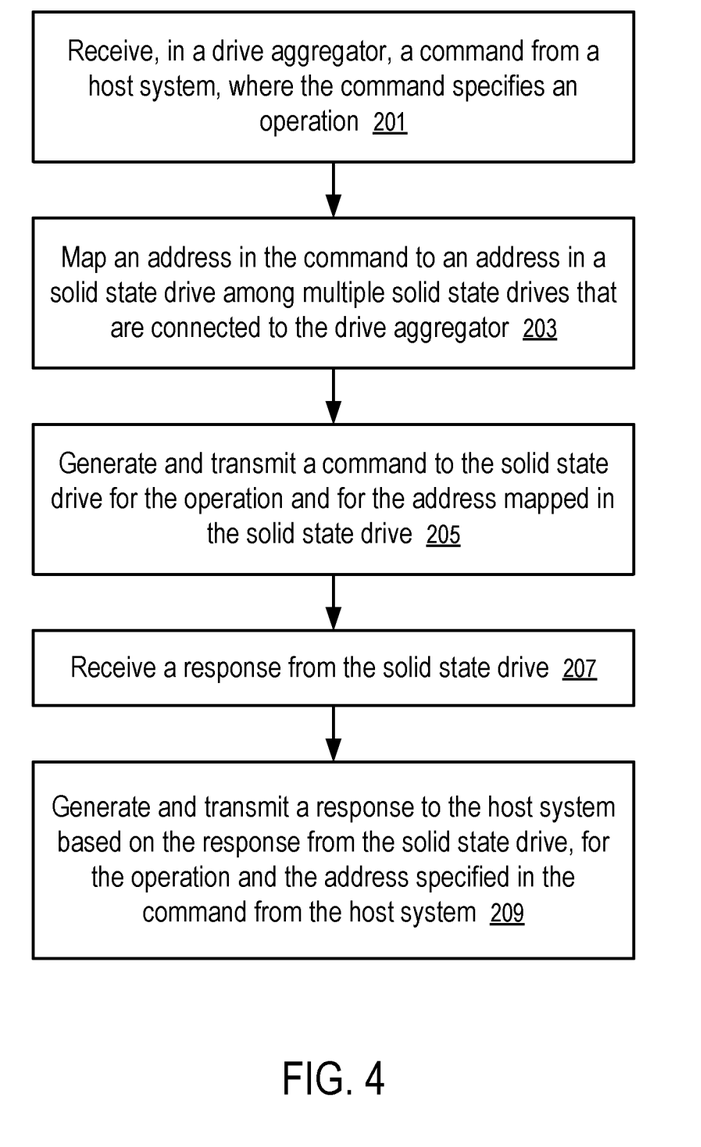
FIG. 4 shows a method implemented in a drive aggregator according to one embodiment.

FIG. 4 shows a method implemented in a drive aggregator 103 according to one embodiment. For example, the method of FIG. 4 can be implemented in the drive aggregator 103 illustrated in FIGS. 1, 2, and/or 3.

At block 201, a drive aggregator 103 receives a command from a host system 111. The command specifies an operation to be performed by a solid state drive 101. The drive aggregator 103 functions as the controller of a single solid state drive 101 to the host system 111. Thus, the commands from the host systems 111 to the drive aggregator are configured as being addressed to the same solid state drive 101. The drive aggregator 103 is connected to multiple solid state drives 107 to 109.

At block 203, the drive aggregator 103 maps an address in the command from the host system 111 to an address in a solid state drive (e.g., 107 or 109) among multiple solid state drives 107 to 109 that are connected to the drive aggregator 103. The mapping can be based on a namespace specified in the command from the host system 111, a predetermined address mapping scheme, and/or an address map 159.

At block 205, the drive aggregator 103 generates and transmits a command to the solid state drive (e.g., 107 or 109). The command to the solid state drive (e.g., 107 or 109) is configured for the operation specified in the command received from the host system 111 and for the address mapped in the solid state drive (e.g., 107 or 109).

For example, a logical address defined in a namespace created in the memory capacity of the single solid state drive 101 can be mapped to the same logical address defined in the namespace created in the memory capacity of a solid state drive (e.g., 107 or 109) that is assigned to implement the namespace.

For example, the space of logical addresses defined in the entire memory capacity of the single solid state drive 101 represented by the drive aggregator 103 can be divided into regions (e.g., according to a predefined scheme). Different regions can be mapped to the spaces of logical addresses defined in the memory capacities of the component solid state drives 107 to 109.

When the communication protocol between the host system 111 and the drive aggregator 103 is different from the communication protocol between the drive aggregator 103 and the component solid state drives 107 to 109, the drive aggregator 103 can perform the command translation according to the communication protocols.

When the communication protocol between the host system 111 and the drive aggregator 103 is same as the communication protocol between the drive aggregator 103 and the component solid state drives 107 to 109, the drive aggregator 103 can be configured to forward the command to the target solid state drive 101 without changes in some implementations (e.g., when the address mapping is based on namespace).

For example, the communication protocol between the host system 111 and the drive aggregator 103 and the communication protocol between the drive aggregator 103 and the component solid state drives 107 to 109 can each be any one of standard protocols, such as a protocol for a serial advanced technology attachment (SATA) interface, a protocol for a peripheral component interconnect express (PCIe) interface, a protocol for a universal serial bus (USB) interface, a protocol for a fibre channel, etc.

At block 207, the drive aggregator 103 receives a response from the solid state drive (e.g., 107 or 109) that is responsive to the command to the solid state drive (e.g., 107 or 109).

At block 209, the drive aggregator 103 generates and transmits a response to the host system 111 based on the response from the solid state drive (e.g., 107 or 109), where the response to the host system is responsive to the command from the host system for the operation and the address specified in the command from the host system.

In some implementations, the drive aggregator 103 performs protocol translation to account for the protocol differences between the connection 135 to the host system 111 and the connection (e.g., 137) to the component solid state drive (e.g., 109). In other implementations, the drive aggregator 103 performs further adjust for the response to the host system 111 to account for the logical address differences between the command from the host system 111 and the command to the component solid state drive (e.g., 109).

Figure 5:
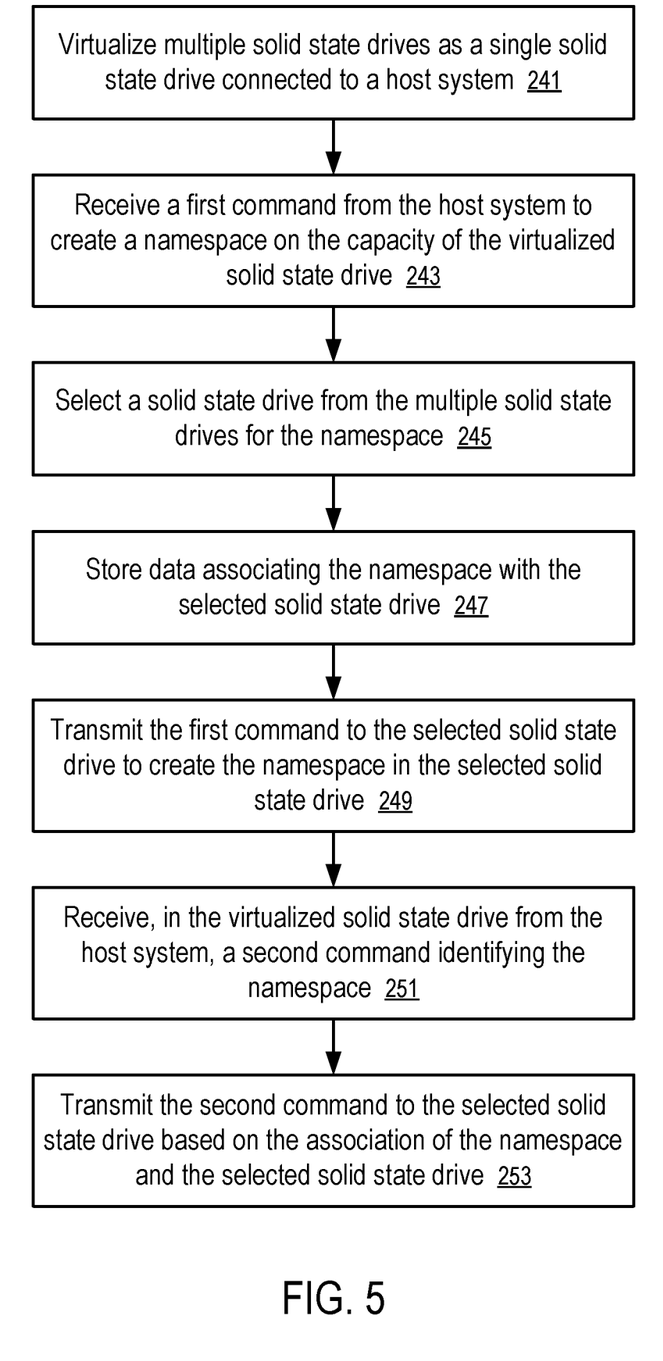
FIG. 5 shows a method of distributing commands received in a virtualized solid state drive to solid state drives.

FIG. 5 shows a method of distributing commands received in a virtualized solid state drive to solid state drives. For example, the method of FIG. 5 can be implemented in a virtualized solid state drive 101 of FIG. 1 having component solid state drives 107 to 109 in a configuration illustrated in FIG. 2. For example, the method of FIG. 5 can be implemented in the drive aggregator 103 illustrated in FIGS. 1, 2, and/or 3.

At block 241, a drive aggregator 103 virtualizes multiple solid state drives 107 to 109 as a single solid state drive 101 connected to a host system 111.

At block 243, the drive aggregator 103 receives a first command from the host system 111 to create a namespace on the capacity of the virtualized solid state drive 101.

At block 245, the drive aggregator 103 selects a solid state drive (e.g., 107 or 109) from the multiple solid state drives 107 to 109 for the namespace.

At block 247, the drive aggregator 103 stores data associating the namespace with the selected solid state drive (e.g., 107 or 109).

At block 249, the drive aggregator 103 transmits the first command to the selected solid state drive (e.g., 107 or 109) to create the namespace in the selected solid state drive (e.g., 107 or 109).

At block 251, the drive aggregator 103 receives from the host system 111 a second command identifying the namespace.

At block 253, the drive aggregator 103 transmits the second command to the selected solid state drive (e.g., 107 or 109) based on the association of the namespace and the selected solid state drive.

The technique of distributing commands to component solid state drives 107 to 109 as in FIG. 5 can simplify the translation logic 153 of the drive aggregator 103 and thus reduces the complexity, energy consumption, and cost of the translation logic 153.

The methods discussed above (e.g., in connection with FIGS. 4 and/or 5) can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods of FIGS. 4 and/or 5 are performed at least in part by the drive aggregator 103 of FIG. 1, 2, or 3. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In some implementations, a communication channel between the host system 111 and a memory sub-system (e.g., the solid state drive 101) includes a computer network, such as a local area network, a wireless local area network, a wireless personal area network, a cellular communications network, a broadband high-speed always-connected wireless communication connection (e.g., a current or future generation of mobile network link); and the host system 111 and the memory sub-system can be configured to communicate with each other using data storage management and usage commands similar to those in NVMe protocol.

Some embodiments involving the operations of the drive aggregator 103 can be implemented using computer instructions executed by one or more microprocessors. The computer instructions can be configured as the firmware of the solid state drive 101. In some instances, hardware circuits can be used to implement at least some of the functions. The firmware can be initially stored in the non-volatile storage media, or another non-volatile device, and loaded into the volatile DRAM and/or the in-processor cache memory for execution by the microprocessors of the drive aggregator.

A non-transitory computer storage medium can be used to store instructions of the firmware of a memory sub-system (e.g., the solid state drive 101, or any of the component solid state drives 107 to 109). When the instructions are executed by the microprocessors, the instructions cause the memory sub-system to perform a method discussed above.

In general, an example machine of a computer system can have a set of instructions, for causing the machine to perform any one or more of the methods discussed herein. In some embodiments, such a computer system can correspond to a host system (e.g., the host system 111 of FIG. 1) that includes, is coupled to, or utilizes a memory sub-system (e.g., the solid state drive 101 of FIG. 1) or can be used to perform the operations of a drive aggregator 103 (e.g., to execute instructions to perform operations corresponding to the drive aggregator 103 described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example machine can include a processing device, a main memory (e.g., read-only memory (ROM), flash memory, dynamic random access memory (DRAM) such as synchronous DRAM (SDRAM) or Rambus DRAM (RDRAM), static random access memory (SRAM), etc.), and a data storage system, which communicate with each other via a bus (which can include multiple buses).

A processing device discussed herein can include one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. A processing device discussed herein can also be one or more special-purpose processing devices such as an application specific integrated circuit (ASIC), a field programmable gate array (FPGA), a digital signal processor (DSP), network processor, or the like. A processing device generally is configured to execute instructions for performing the operations and steps discussed herein. The example machine can further include a network interface device to communicate over a computer network.

The data storage system disclosed herein can include a machine-readable storage medium (also known as a computer-readable medium) on which is stored one or more sets of instructions or software embodying any one or more of the methodologies or functions described herein. The instructions can also reside, completely or at least partially, within the main memory and/or within the processing device during execution thereof by the computer system, the main memory and the processing device also constituting machine-readable storage media. The machine-readable storage medium, data storage system, and/or main memory can correspond to the memory sub-system.

In one embodiment, the instructions stored in the example machine include instructions to implement functionality corresponding to a drive aggregator 103 (e.g., as described with reference to FIGS. 1-5). While the machine-readable storage medium may be discussed in an embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A solid state drive, comprising:
   a drive aggregator configured to interface with a host system; and
   a plurality of component solid state drives connected to the drive aggregator to aggregate the plurality of component solid state drives to operate as a single aggregated solid state drive, wherein the plurality of component solid state drives comprises at least a first solid state drive and a second solid state drive, wherein the first solid state drive comprises a first controller configured to process commands from host systems and the second solid state drive comprises a second controller configured to process commands from the host systems;
   wherein the drive aggregator is configured to receive commands from the host system and transmit commands to the aggregated solid state drive to implement the commands received from the host system;
   wherein the drive aggregator comprises a host interface configured to communicate between host systems and the aggregated solid state drive consisting of the plurality of component solid state drives according to a first protocol of communications, a plurality of drive interfaces configured to communicate between the host system and the plurality of component solid state drives according to a second protocol of communications, wherein the first protocol between the aggregated solid state drive consisting of the plurality of component solid state drives and the host is supported by the component solid state drives, and a translation logic coupled between the host interface and the plurality of drive interfaces;
   wherein the translation logic is configured to distribute commands received in the host interface to the drive interfaces based on namespaces identified in the commands received in the host interface; and
   wherein the host system is configured to recognize and communicate directly to the first solid state drive to access data upon connection of the first solid state drive directly to the host system without use of the drive aggregator.

2. The solid state drive of claim 1, further comprising:
   a printed circuit board having pins for a connection to the host system over a computer bus;
   wherein the drive aggregator and the plurality of component solid state drives are mounted on the printed circuit board.

3. The solid state drive of claim 2, wherein each of the component solid state drives is integrated within an integrated circuit package.

4. The solid state drive of claim 3, wherein the integrated circuit package has a ball grid array (BGA) form factor.

5. The solid state drive of claim 1 wherein each of the first protocol and the second protocol is one of:
a protocol for a serial advanced technology attachment (SATA) interface; a protocol for a peripheral component interconnect express (PCIe) interface; a protocol for a universal serial bus (USB) interface; and a protocol for a fibre channel.

6. The solid state drive of claim 5, wherein the translation logic is configured to distribute commands received in the host interface to the drive interfaces based on logical addresses specified in the commands received in the host interface.

7. The solid state drive of claim 1, wherein the first controller and the second controller are each configured to process commands received directly from the host systems.

8. A drive aggregator, comprising:
a host interface configured to communicate with a host system;
a plurality of drive interfaces to communicate with a plurality of component solid state drives respectively to aggregate the plurality of component solid state drives to operate as a single aggregated solid state drive, wherein the plurality of component solid state drives comprises at least a first solid state drive and a second solid state drive, wherein the first solid state drive comprises has a first controller configured to process commands from host systems and the second solid state drive comprises a second controller configured to process commands from the host systems; and
a translation logic coupled between the host interface and the plurality of drive interfaces;
wherein the host interface is configured to communicate between host systems and the aggregated solid state drive consisting of the plurality of component solid state drives according to a first protocol of communications, and the plurality of drive interfaces are configured to communicate between the host system and the plurality of component solid state drives according to a second protocol of communications, wherein the first protocol between the aggregated solid state drive consisting of the plurality of component solid state drives and the host is supported by the component solid state drives;
wherein the translation logic is configured to distribute commands received in the host interface to the drive interfaces based on namespaces identified in the commands received in the host interface; and
wherein the host system is configured to recognize and communicate directly to the first solid state drive to access data upon connection of the first solid state drive directly to the host system without use of the drive aggregator.

9. The drive aggregator of claim 8, further comprising:
an integrated circuit package, wherein the host interface, the translation logic and the plurality of drive interfaces are packaged in the integrated circuit package.

10. The drive aggregator of claim 9, wherein the translation logic includes a field programmable gate array (FPGA) or an application specific integrated circuit (ASIC).

11. The drive aggregator of claim 8, wherein the host interface is configured to implement a point to point serial connection between the host system and a solid state drive; and each of the plurality of drive interfaces is configured to implement a point to point serial connection between a host system and one of the component solid state drives.

12. The drive aggregator of claim 8, wherein the first controller and the second controller are each configured to process commands received directly from the host systems.

13. A method, comprising:
receiving according to a first protocol of communications, in a drive aggregator, a first command from a host system, the command specifying an operation;
mapping, by the drive aggregator, an address in the first command to an address in a solid state drive among a plurality of component solid state drives that are connected to the drive aggregator, wherein the plurality of component solid state drives are aggregated to operate as a single aggregated solid state drive, and further wherein the plurality of component solid state drives comprises at least a first solid state drive and a second solid state drive, wherein the first solid state drive comprises has a first controller configured to process commands from host systems and the second solid state drive comprises a second controller configured to process commands from the host systems;
transmitting according to a second protocol of communications, by the drive aggregator to one of the component solid state drives within the aggregated solid state drive, a second command for the operation specified in the command and for the address in the solid state drive;
receiving according to the second protocol of communications, in the drive aggregator from the one of the component solid state drives within the aggregated solid state drive, a response to the second command; and
transmitting according to the first protocol of communications, by the drive aggregator to the host system, a response to the first command, based on the response received from the solid state drive;
receiving, in the drive aggregator and from the host system, a command to create a namespace in a capacity of a single solid state drive;
selecting, for the namespace, a selected drive in the plurality of solid state drives; storing data associating the namespace with the selected drive; and
transmitting, from the drive aggregator to the selected drive, a command to create the namespace in the capacity of the selected drive in the plurality of solid state drives,
wherein the host system is configured to recognize and communicate directly to the first solid state drive to access data upon connection of the first solid state drive directly to the host system without use of the drive aggregator.

14. The method of claim 13, further comprising:
receiving, in the drive aggregator, commands from the host system as the single solid state drive to the host system; and
implementing, by the drive aggregator, the commands using the plurality of solid state drives that are connected to the drive aggregator.

15. The method of claim 14, wherein the implementing of the commands from the host system includes:
generating commands to the plurality of solid state drives based on mapping addresses in the capacity of the single solid state drive into addresses in the plurality of solid state drives.

16. The method of claim 15, further comprising:
receiving, in the drive aggregator, commands of the host system identifying the namespace; and forwarding, by the drive aggregator based on the data associating the namespace with the selected drive, the commands of the host system identifying the namespace to the selected drive in the plurality of solid state drives.

17. The method of claim 13, wherein the plurality of solid state drives that are connected to the drive aggregator are ball grid array (BGA) solid state drives.

18. The method of claim 13, wherein the mapping is based on a namespace specified in the first command from the host system.

19. The method of claim 13, wherein the first controller and the second controller are each configured to process commands received directly from the host systems.

* * * * *